(12) United States Patent
Gutmann et al.

(10) Patent No.: US 7,950,305 B2
(45) Date of Patent: May 31, 2011

(54) TOOTHING SYSTEM OF A GEARWHEEL HAVING INVOLUTE ROLLER TOOTHING

(75) Inventors: Peter Gutmann, München (DE); Jin Hong Li, München (DE)

(73) Assignee: Sona BLW Prazisionsschmiede GmbH, Munich (DE)

( * ) Notice: Subject to any disclaimer, the term of this patent is extended or adjusted under 35 U.S.C. 154(b) by 216 days.

(21) Appl. No.: 12/282,400

(22) PCT Filed: Jan. 20, 2007

(86) PCT No.: PCT/EP2007/000492
§ 371 (c)(1),
(2), (4) Date: Sep. 10, 2008

(87) PCT Pub. No.: WO2007/118522
PCT Pub. Date: Oct. 25, 2007

(65) Prior Publication Data
US 2009/0064812 A1    Mar. 12, 2009

(30) Foreign Application Priority Data
Mar. 31, 2006  (DE) .......................... 10 2006 015 521

(51) Int. Cl.
*F16H 55/08*  (2006.01)
*F16H 55/10*  (2006.01)
*F16H 55/17*  (2006.01)
(52) U.S. Cl. .......................................... 74/457; 74/434
(58) Field of Classification Search ................ 74/421 R, 74/434, 457, 459.5, 460, 462
See application file for complete search history.

(56) References Cited

U.S. PATENT DOCUMENTS
2,389,728 A    11/1945  Hill
(Continued)

FOREIGN PATENT DOCUMENTS
DE    19958670    8/2000
DE    10208408    9/2003

OTHER PUBLICATIONS
International Search Report and Written Opinion dated May 7, 2007from the corresponding PCT/EP07/000492.

*Primary Examiner* — Justin Krause
(74) *Attorney, Agent, or Firm* — Katten Muchin Rosenman LLP

(57) ABSTRACT

In the toothing system (1) of a gearwheel having a plurality of teeth (2, 3; 19) whose tooth flanks (4, 5, 6; 22) have involute form above a tooth-root region (7, 8, 9; 23) of the tooth flanks (4, 5, 6; 22), the tooth-root region (7, 8, 9; 23) of the tooth flanks (4, 5, 6; 22) that, as viewed in normal section, extends between a root useful point (15, 16, 17; 23) and a root point (F) has elliptical shape, tangentially adjoins the involute region of the tooth flank (4, 5, 6; 22) at the root useful point (15, 16, 17; 24) and tangentially contacts the root circle (FKS) at the root point (F). In its tooth-root region (7, 8, 9; 23), the tooth flank (4, 5, 6; 22), as viewed in normal section, substantially follows a partial section (B) of an ellipse (10, 11, 12; E) whose semiaxes (a, b) have different lengths, one semiaxis (a, b) of the ellipse (10, 11, 12; E) being inclined at an ellipse tilting angle alpha larger than 0° and smaller than 90° relative to a radial (R) through the root point (F). Furthermore, the tooth flanks (4, 5, 6; 22) of the teeth (2, 3; 19) of the toothing are symmetric to one another across a symmetry plane (A) that divides the respective tooth (2, 3; 19) in axial direction.

11 Claims, 2 Drawing Sheets

U.S. PATENT DOCUMENTS

| | | |
|---|---|---|
| 4,106,361 A | 8/1978 | Wilson |
| 4,149,431 A * | 4/1979 | Rouverol .................... 74/462 |
| 4,308,760 A * | 1/1982 | Voigtlander et al. ......... 74/459.5 |
| 4,589,300 A * | 5/1986 | Rouverol .................... 74/462 |
| 4,754,661 A * | 7/1988 | Barnett ...................... 74/459.5 |
| 6,178,840 B1 * | 1/2001 | Colbourne et al. ............ 74/462 |
| 6,324,931 B1 * | 12/2001 | Tsung ........................ 74/459.5 |
| 6,571,655 B2 * | 6/2003 | Tanaka ....................... 74/462 |

* cited by examiner

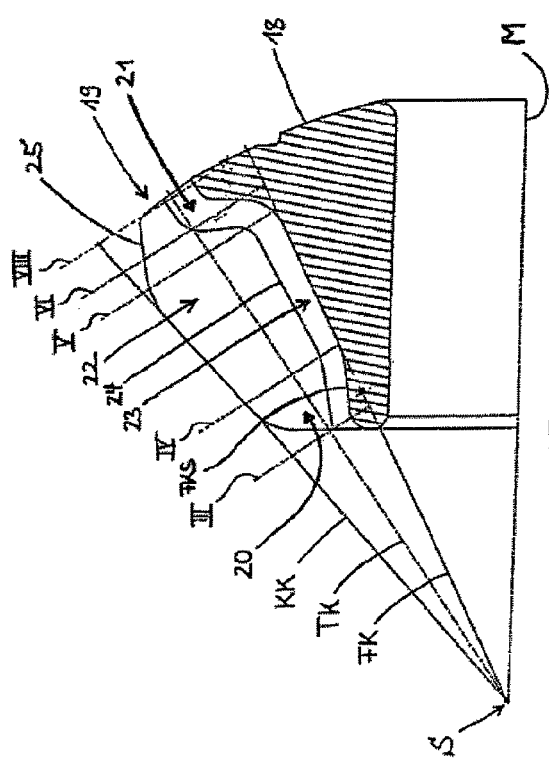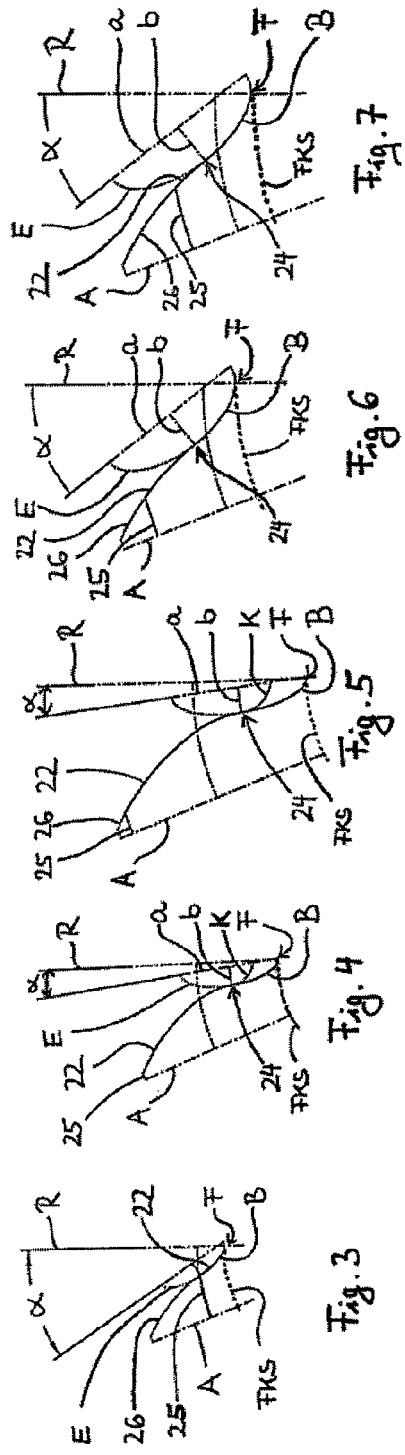

TOOTHING SYSTEM OF A GEARWHEEL HAVING INVOLUTE ROLLER TOOTHING

BACKGROUND OF THE INVENTION

1. Field of the Invention

The present invention relates to the toothing system of a gearwheel having a plurality of teeth whose tooth flanks have involute form above a tooth-root region of the tooth flanks, wherein the tooth-root region of the tooth flanks that, as viewed in normal section, extends between a root useful point and a root point has elliptical shape, tangentially adjoins the involute region of the tooth flank at the root useful point and tangentially contacts the root circle at the root point. The present invention also relates to a gearwheel having a corresponding toothing system as well as to a gearwheel pair comprising two such gearwheels.

2. Description of the Related Art

Such toothing systems and gearwheels having elliptical tooth-root fillet are known from the prior art.

From DE 10208408 A1 there is additionally known a non-involute toothing system for the impeller of a gear pump, in which the meshing tooth tips and tooth roots of the teeth are formed by elliptical curves that merge into one another. In this way it is provided in particular that the mutually facing tooth flanks of two neighboring teeth, as viewed in normal section, are formed in their tooth-root region by a common partial section of an ellipse, whose minor semiaxis lies within the symmetry plane—formed by the radial through the root point—through the tooth space.

A further pump toothing system is known from U.S. Pat. No. 2,389,728, which system has an annular gear with internal toothing and an internal gearwheel running eccentrically within the internal toothing of the annular gear. In this case the flank profile of the teeth of the internal toothing of the external annulus is defined in the tooth-tip region by an ellipse. The geometry of the toothing of the internal gearwheel is then calculated from the toothing equation. To favor one running direction of the pump, the semiaxis of the ellipse defining respectively one tooth of the internal toothing can be tilted if necessary toward the radial direction, thus yielding an asymmetric tooth shape and favoring one running direction of the pump toothing.

In gearwheels having involute roller toothing, a toothing system with circular tooth-root fillet is generally found in practice. Nevertheless, DE 19958670 B4 mentions, in connection with the most diverse gearwheel types, the possibility in principle of an elliptical tooth-root fillet, although it does not go into further detail in this regard. From practice it is additionally known that an elliptical tooth-root fillet can reduce the tooth-root stress that occurs during rolling movement; in such a case one semiaxis of the ellipse defining the flank profile of the toothing in the tooth-root region always lies within the symmetry plane of the tooth space.

SUMMARY OF THE INVENTION

Starting from the already known prior art, it is the object of the present invention to provide a toothing system, of the type mentioned in the introduction, for a gearwheel having involute roller toothing, which system guarantees further improved tooth-root strength.

This object is achieved with a toothing system according to claim 1. According to the invention, the tooth flank of a tooth, as viewed in normal section, substantially follows, in its tooth-root region, or in other words below the respective root useful point, a partial section of an ellipse whose semiaxes a and b have different lengths, one semiaxis of the ellipse being inclined at an ellipse tilting angle alpha larger than 0° and smaller than 90° relative to a radial through the root point. Furthermore, in an inventive toothing system, the respective two tooth flanks of a tooth are symmetric to one another across a symmetry plane that divides the tooth in axial direction. The tangential conditions already mentioned in the introduction with regard to the profile of the tooth flank at the mutual ends of the tooth-root region of the tooth flank therefore represent a secondary condition for the partial elliptical section to be selected or for the ellipse itself.

Thus a toothing system capable of running equally well in both running directions is provided with the invention. The elliptical tooth-root region of an inventive toothing system, as viewed in normal section, is bounded at its upper end by the root useful point and at its lower end by the root point.

In this case there is to be regarded, as the root useful point within the meaning of the invention, that respective point of the tooth flank, as viewed in normal section, of the toothing system above which the toothing has involute form. In every normal section, therefore, the root useful point represents the very lowest point of the flank profile of a tooth that rolls with a toothing system of conjugate geometry. If the toothing parameters are known, the root useful point is preferably obtained in known manner as the very lowest contact point from the toothing equation, but nevertheless it may also be chosen without restriction above the very lowest contact point if, for example, the region of the tooth flank having involute roller toothing is to be intentionally shortened, as is common, for example, in bevel gears in the region of a raised level of the tooth root in the teeth end regions facing away from one another.

By root point there is to be understood the very lowest and therefore radially innermost point of the tooth flank as viewed in normal section. It is what normally defines the root circle of the gearwheel in the case of a cylindrical gearwheel, or the root cone of the bevel gear in the case of a bevel gear. In the case of bevel gears, however, it must be kept in mind that the root circle as viewed in normal section does not have to coincide with the root cone over the entire tooth length, since the toothing of a bevel gear frequently—especially in the region of the mutual ends of the toothing having the smallest and largest diameter—has a raised level of the tooth-root contour. In a bevel gear, therefore, a tooth-root profile deviating from conical form can occur in certain regions over the tooth length or over the pitch-cone distance.

If the tooth flanks of two neighboring teeth merge directly into one another without any intermediate region, the radial through the root point corresponds in normal section to the symmetry axis of the tooth space.

Because of the flank profile in the tooth-root region, which profile is defined by an ellipse tilted relative to the aforesaid radial through the root point and by the two tangential conditions, the cross-sectional change of the teeth over their tooth height is more gentle than in the already known prior art, and according to the invention this results in greater load-bearing capacity of the tooth root in both running directions. In this regard an inventive toothing system is superior not only to conventional gearwheels having circular tooth-root fillet but also to an elliptical tooth-root fillet with an ellipse that lies symmetrically in the tooth space and is not inclined relative to the radial through the root point.

In gearwheels having involute roller toothing, a force acting substantially perpendicularly on the tooth flank of a tooth in the tooth-tip region produces, in the tooth-root region of the tooth, a stress distribution that can be calculated, for example according to DIN 3990 or ISO 6336, this distribution being a determining factor for the load-bearing capacity of the tooth root. In the case of bevel gears, the tooth-root stress, which varies as a function of the pitch-cone distance, is preferably calculated for each normal section using what is known as an equivalent cylindrical gear having the toothing parameters of the respective normal section. Toothing systems having higher stresses in the tooth-root region under otherwise equal conditions and equal force action offer lower tooth-root load-bearing capacity. Numerical calculations show that, in the case of an elliptical tooth-root fillet such as that on which the present invention is based, the tooth-root stress is smaller on the whole and that smaller stress peaks develop in the tooth-root region than in prior art toothing systems. This leads to the desired greater tooth-root strength.

In particular—by virtue of the mutually symmetric configuration of the two tooth flanks of the teeth—this is also true for a corresponding action of force on the opposite flank of the tooth and thus for both possible running directions of a gearwheel pair configured with an inventive toothing system.

The tooth-flank profile in the tooth-root region of an inventive toothing should "substantially" follow the partial section of an ellipse tilted as explained in the foregoing. This description therefore encompasses not only an exact elliptical profile of the tooth-root region of the tooth flank, but also minor deviations, such as occur in connection with normal manufacturing tolerances. In particular, not only a partial section of an ellipse, or in other words an elliptical arc, but also be approximated as desired by other mathematical functions, and so such approximations, provided they do not deviate significantly or provided they deviate only slightly from the claimed partial section of an ellipse oriented according to the invention, should also be encompassed by the present technical teaching.

In a first preferred embodiment of the invention, it is provided that—again as viewed in normal section through the toothing—the larger of the two semiaxes of the ellipse defining the tooth flank in the tooth-root region is inclined by the ellipse tilting angle alpha, with 0°<alpha<45°, from the radial through the root point in the direction of the respective tooth flank. Advantageously, the root point of the toothing is then located lower than it would be in a circular tooth-root fillet having constant radius and corresponding tangential conditions. Because the root point is located lower than is the case of a conventional tooth-root fillet with circular tooth-root fillet, there is therefore obtained a tooth that is higher, as measured radially from the root point to the tooth tip. Although this leads to a longer lever action in the case of a force acting perpendicularly on the tooth flank in the tooth-tip region, even here the stress peaks in the tooth-root region are reduced compared with a conventional toothing system. This in turn is due to the fact that the cross section of the tooth changes more gently over its height by virtue of the tooth-root region defined by a partial section of a tilted ellipse. In addition, the longer lever has a further effect: Specifically, the spring stiffness of the tooth is somewhat smaller, and the tooth tip is deflected to a slightly greater extent. In conjunction with the smaller tooth-root stress, this leads to a reduction of the effect of meshing jolts, which in turn increases the tooth-root load-bearing capacity.

According to a further advantageous embodiment of the invention, it is provided that the ellipse parameters, or in other words the lengths of semiaxes a and b of the ellipse, as well as the ellipse tilting angle, are chosen in such a way as to minimize the maximum stress value in the root region of the tooth, which value, during design of the toothing system, is numerically calculated under predesignated force action. In particular, as numerical calculations show, the maximum stress value in the root region of a tooth of the toothing system depends on the chosen ellipse parameters, and so the tooth-root load-bearing ability can be further improved by skillful choice of the ellipse parameters. In the process, it is obviously always necessary to take care that a partial section of the ellipse defined by the ellipse parameters satisfies the tangential conditions at the root useful point and at the root point. As an example, the maximum stress occurring in the root region of the tooth can be minimized by varying the ellipse parameters a, b and alpha within suitable value ranges and calculating the respective resulting stress distribution in the tooth-root region of the tooth. The person skilled in the art is familiar with the numerical methods that can be used for this purpose, in order to design, in the manner explained in the foregoing, a tooth flank that is optimized with respect to the lowest possible tooth-root stress in the tooth-root region.

Furthermore, an inventive toothing system can preferably be configured such that the tooth flanks of two neighboring teeth merge directly into one another without any intermediate region, as is possible due to the respective tangential conditions at the root point of the mutually facing tooth flanks. In this case, therefore, the mutually adjoining tooth-root regions of the tooth flanks of the two teeth are respectively defined by a partial section of two differently oriented ellipses; the respective ellipses have equally long semiaxes a and b and are inclined with one semiaxis—respectively starting from the symmetry plane through the tooth space—by the same angle alpha relative to the respective tooth flank.

The present invention relates not only to the inventive toothing system as such but also to a gearwheel equipped with an inventive toothing and to a gearwheel pair comprising two corresponding gearwheels.

An inventive gearwheel may be advantageously a cylindrical gear or a bevel gear, which preferably can be designed with straight toothing. However, the teaching according to the patent is not limited thereto, since the invention can in principle also be applied to helical-toothed gearwheels. In such cases a section plane running perpendicular to the helix angle would then be considered as the normal section.

In cylindrical gears with an inventive toothing system, the elliptical tooth-root region of the tooth flank can preferably be constant over the entire axial length or width of the tooth. Also conceivable, however, is a variation of the ellipse parameters over the tooth width, especially if the tooth flanks are configured with crowning, for example in the form of end relief, which can be generated, for example, by variation of the addendum modification, or of any other modification that influences the involute tooth-flank region. In the region of such a modification, adaptation of the ellipse parameters is advisable or necessary in order to satisfy the tangential conditions. Depending on the type of modification, it may be necessary to adapt one or more ellipse parameters appropriately and to keep others constant.

For bevel gears, on the other hand, one or more ellipse parameters must be adapted to the respective pitch-cone distance. According to an advantageous embodiment of the invention, an inventive bevel gear is therefore configured in such a way that the length of the semiaxes a and b of the ellipse and/or the ellipse tilting angle alpha vary over the pitch-cone distance of the respective normal section under consideration.

In a bevel gear with regular toothing, this adaptation can advantageously be achieved relatively simply, for example—starting from the ellipse parameters chosen for a particular pitch-cone distance—by keeping the ellipse tilting angle alpha constant over the entire tooth length and, in order to satisfy the respective tangential conditions at the respective pitch-cone distance, by adapting only the respective length of the semiaxes of the ellipse—if necessary with constant semiaxis ratio a/b—as a function of the pitch-cone distance.

However, if the bevel toothing is subjected, over the length of the teeth, to further modifications that are related not only to the increase in the pitch circle as a function of pitch-cone distance, it will be preferable to adapt all ellipse parameters separately for each pitch-cone distance.

For this purpose, one option in the design of the toothing system is firstly to define the ellipse parameters for certain pitch-cone distances. In the respective intermediate regions, the tooth flank in the tooth-foot region can then be transitioned gradually, for example with common interpolation methods, from one ellipse arc to the other ellipse arc, provided the tangential conditions are respected. Furthermore, it is also advantageously possible to define the intermediate regions in the tooth-root region of the tooth flank by imposing respective exact ellipse parameters for each pitch-cone distance, which parameters can be obtained, for example, by interpolation—of linear type if appropriate—of the ellipse parameters preselected at the boundary of the intermediate regions. Here also, however, the tangential conditions at the root useful point and at the root point must be satisfied, in order to achieve a smooth transition of the tooth root into the involute on the one hand and into the tooth flank of the other tooth or into the tooth space on the other hand.

Depending on the specific configuration of the toothing system of a bevel gear, it may also be advisable to subdivide the toothing into several regions as a function of the pitch-cone distance, or in other words over the length of the teeth, thus making it possible to take advantage of suitable relationships for variation of the ellipse parameters within each region. In particular, the ellipse tilting angle can be kept constant in certain regions, whereas it will be varied as a function of the pitch-cone distance in other regions. In many regions a constant semiaxis ratio a/b proves to be practical, whereas in other regions it can be varied—linearly if appropriate—with the pitch-cone distance.

Preferably an inventive bevel gear will have an inventive toothing system, in which both the ellipse tilting angle alpha and the semiaxis ratio a/b are constant at least over part of the length of the teeth.

Because of the complex configuration of the tooth-root region of their toothing system, it will be preferable to manufacture the inventive gearwheels by shaping methods, such as forging. Nevertheless, manufacture by chip-removing methods is also possible.

BRIEF DESCRIPTION OF THE DRAWINGS

The invention will now be explained on the basis of the drawing, wherein:

FIG. 2 shows a section constructed axially through an exemplary embodiment of an inventive bevel gear, and FIGS. 3 to 7 show various normal sections through the toothing system of the bevel gear according to FIG. 2.

DETAILED DESCRIPTION OF THE INVENTION

Figure 1:
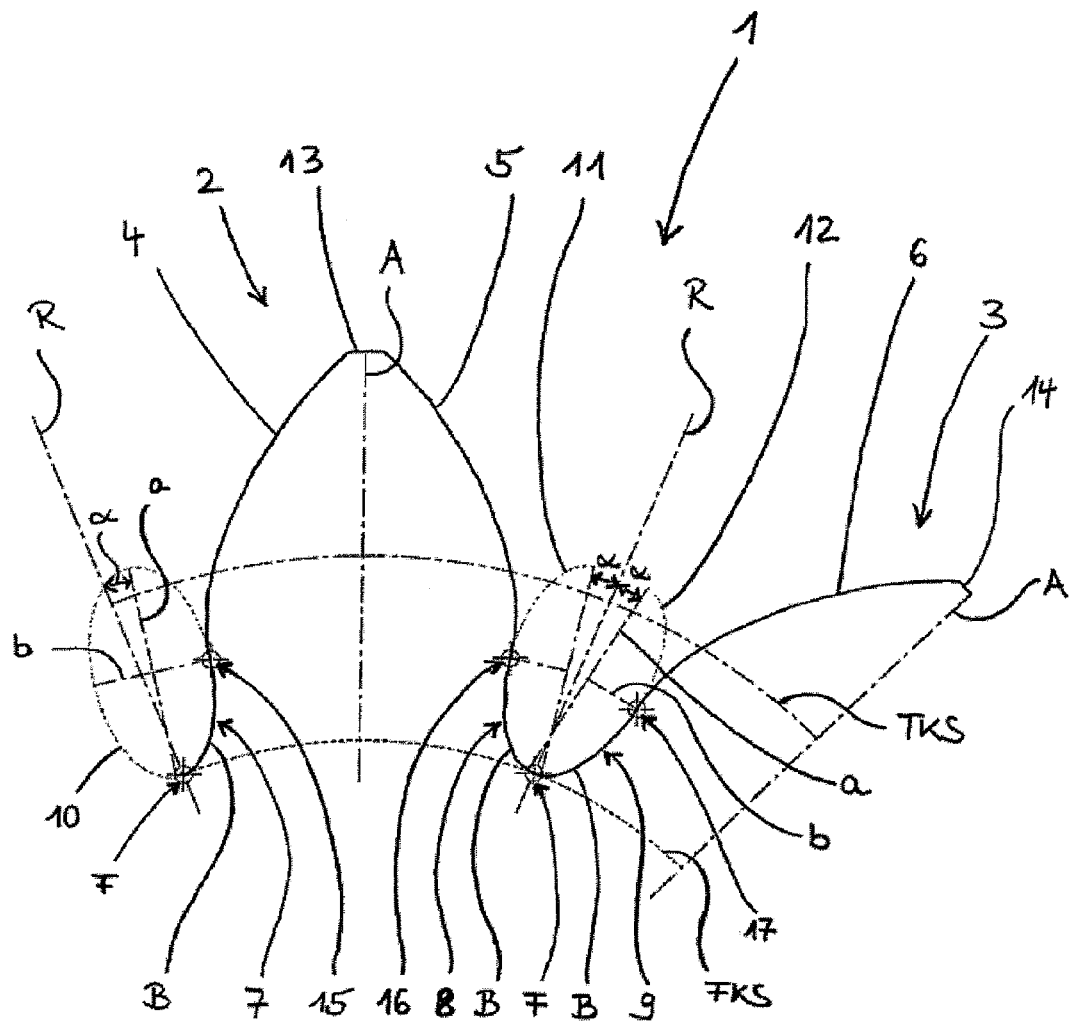
FIG. 1 shows an exemplary embodiment of an inventive toothing system of a cylindrical gearwheel in normal section.

In FIG. 1, a portion of toothing system 1 of an exemplary embodiment of an inventive, straight-toothed cylindrical gearwheel is illustrated in normal section. The flank profile of two teeth 2, 3 is apparent, but of tooth 3 illustrated on the right of FIG. 1, only the part up to symmetry plane A, which divides the tooth in axial direction, is shown.

Tooth flanks 4, 5, 6 of teeth 2, 3 respectively have involute form above a tooth-root region 7, 8, 9, whereas the profile of tooth flanks 4, 5, 6 in tooth-root region 7, 8, 9 corresponds respectively to a partial section B of an ellipse 10, 11, 12 having semiaxes a, b, where a>b. Elliptically configured tooth-root regions 7, 8, 9 of tooth flanks 4, 5, 6 are bounded in upward direction, or in other words in radially outward direction relative to the center of the gearwheel, which is not shown in FIG. 1, by a respective root useful point 15, 16, 17, which is then adjoined by the involute region of tooth flanks 4, 5, 6 of teeth 2, 3 extending to respective tooth tip 13, 14. At root useful point 15, 16, 17 of respective tooth flank 4, 5, 6, the involute region of tooth flank 4, 5, 6 and tooth-root region 7, 8, 9 of tooth flank 4, 5, 6 formed by partial section B of ellipse 10, 11, 12 merge tangentially into one another. Tooth-root regions 7, 8, 9 are bounded in downward direction, or in other words in radially inward direction, by a respective root point F, at which tooth-root regions 7, 8, 9 tangentially contact root circle FKS. Furthermore, FIG. 1 also shows pitch circle TKS of the toothing system.

Semiaxes a, b, which have different lengths, of the respective ellipses 10, 11, 12, of which only half is illustrated in some cases, are not oriented symmetrically in the tooth space, but instead are inclined to the respective radial R through root point F under an ellipse tilting angle alpha larger than 0° and smaller than 90°. In the present case radial R represents a symmetry axis of the toothing through the tooth space. In this connection, major semiaxis a of the respective ellipse 10, 11, 12, starting from symmetry axis R, is inclined by ellipse tilting angle alpha in the direction of that tooth flank 4, 5, 6 whose tooth-root region is formed by the respective partial section B of ellipse 10, 11, 12. Symmetry axes R and symmetry axes A intersect one another at the center axis—not illustrated—of the gearwheel.

Tooth flank 4 of left tooth 2 illustrated at the left of FIG. 1 is symmetric, across symmetry plane A of tooth 2, to second tooth flank (opposite flank) 5 of the same tooth 2. Likewise, left tooth flank 6 of tooth 3 illustrated at the right of FIG. 1 is symmetric, across symmetry plane A there, to the second tooth flank—not illustrated—of the same tooth 3. The further teeth of the cylindrical gearwheel, only part of which is illustrated in FIG. 1, are configured identically and preferably run with constant tooth flanks in axial direction.

FIG. 2 shows a longitudinal section through an exemplary embodiment of an inventive straight-toothed bevel gear 18, which has the form of a solid of rotation around the axially oriented center axis M and is provided with a plurality of teeth 19. Also illustrated as characteristic lines of bevel gear 18 are root cone FK, pitch cone TK and tip cone KK, whose respective extensions meet in the present case at a common point of intersection S on center axis M. This situation is not an absolute requirement, however, since if necessary it is also permissible to shift the tip cone or root cone in parallel direction in order to adjust the clearance between two bevel gears rolling over one another.

In end regions 20, 21, which face away from one another, of the toothing system, the tooth-root contour is raised, to the effect that root circle FKS is located radially outside root cone FK in these regions.

The section through bevel gear 18 illustrated in FIG. 2 runs exactly through a tooth space, thus revealing a tooth flank 22 of a tooth 19 of the inventive toothing system in frontal view. The profile of root useful point 24 over the pitch-cone distance is therefore visible.

Concerning the profile of tooth flank 22, FIGS. 3 to 7 show several normal sections oriented perpendicular to pitch cone TK, passing through tooth flank 22 for various pitch-cone distances and corresponding to the section lines identified by Roman numerals in FIG. 2. Specifically, FIG. 3 shows section III, FIG. 4 shows section IV, FIG. 5 shows section V, FIG. 6 shows section VI and FIG. 7 shows Section VII.

In the respective normal sections—with the exception of the section of FIG. 3, where tooth flank 22 already ends below root useful point 24 therein because of distinct tip shortening (see also FIG. 2)—tooth flank 22 has involute form above the respective root useful point 24. Below root useful point 24, tooth flank 22 always corresponds, as far as root point F, to a partial section B of an ellipse E—only half of which is illustrated in each case—whose semiaxes a and b vary as a function of the pitch-cone distance. Partial section B of the respective ellipse E ends at each root point F, where it is tangential to root circle FKS, and at each root useful point 24 it merges tangentially into the involute region of tooth flank 22. The respective major semiaxis a of ellipse E is inclined by an angle alpha, which varies over the pitch-cone distance, with $0° < \text{alpha} < 90°$, starting from radial R through the respective root point F in the direction of tooth flank 22.

In a region of tooth flank 22 located between section lines IV and V of FIG. 2, where the respective root circle FKS coincides with root cone FK and root useful points 24 also run along a cone, ellipse tilting angle alpha has a constant value in each normal section. Here only the lengths of semiaxes a and b of the respective ellipses are varied in proportion to the pitch-cone distance, while their semiaxis ratio a/b remains constant. Thus ellipse tilting angle alpha also has approximately the same value in FIGS. 4 and 5; the slight difference is ultimately due to the fact that the section in FIG. 5 is already located in a region of tooth flank 22 where root circle FKS, which is defined by root point F, is located somewhat radially outside of root cone FK because of the rise in level of the tooth root that is already beginning there (see FIG. 2).

Furthermore, in the end regions of the toothing system, tooth tip 25 is shortened relative to tip cone KK. In the absence of this shortening, tooth-flank profile 26—illustrated by dotted lines in FIGS. 3, 5, 6 and 7—would be obtained.

The opposite flank of the tooth, only half of which is illustrated in FIGS. 2 to 7, is symmetric to tooth flank 22 across symmetry plane A. The tooth flank of the neighboring tooth facing tooth flank 22 is adjoined—in a manner analogous to that of the cylindrical gear in FIG. 1—symmetrically across the symmetry plane formed by radial R. The further teeth of bevel gear 18 have analogous configuration.

The invention claimed is:

1. A toothing system (1) of a gearwheel having a plurality of teeth (2, 3; 19) whose tooth flanks (4, 5, 6; 22) have involute form above a tooth-root region (7, 8, 9; 23) of the tooth flanks (4, 5, 6; 22), wherein the tooth-root region (7, 8, 9; 23) of the tooth flanks (4, 5, 6; 22) that, as viewed in normal section, extends between a root useful point (15, 16, 17; 24) and a root point (F) has elliptical shape, tangentially adjoins the involute region of the tooth flank (4, 5, 6; 22) at the root useful point (15, 16, 17; 24) and tangentially contacts the root circle (FKS) at the root point (F), characterized in that, in its tooth-root region (7, 8, 9; 23), the tooth flank (4, 5, 6; 22), as viewed in a transverse cross-section, substantially follows a partial section (B) of an ellipse (10, 11, 12; E) whose semiaxes (a, b) have different lengths, one semiaxis (a, b) of the ellipse (10, 11, 12; E) being inclined at an ellipse tilting angle alpha larger than 0° and smaller than 90° relative to a radial (R) through the root point (F), and in that the tooth flanks (4, 5, 6; 22) of the teeth (2, 3; 19) of the toothing are symmetric to one another across a symmetry plane (A) that divides the respective tooth (2, 3; 19) in axial direction.

2. A toothing system according to claim 1, characterized in that the major semiaxis (a) of the two semiaxes (a, b) of the ellipse (10, 11, 12; E) is inclined at the ellipse tilting angle alpha, with $0° < \text{alpha} < 90°$, from the radial (R) through the root point (F) toward the tooth flank (4, 5, 6; 22).

3. A toothing system according to claim 1, characterized in that the semiaxes (a, b) of the ellipse (10, 11, 12; E) as well as the ellipse tilting angle alpha are chosen in such a way that the maximum stress in the root region of the tooth is minimal for a predesignated force acting perpendicular to the tooth flank (4, 5, 6; 22) in the tooth-root region.

4. A toothing system according to claim 1, characterized in that the mutually facing tooth flanks (5, 6) of two neighboring teeth (2, 3) merge tangentially into one another without any intermediate space.

5. A gearwheel with a toothing system according to claim 1, characterized in that the gearwheel is a cylindrical gear.

6. A gearwheel pair comprising two gearwheels according to claim 5.

7. A gearwheel according to claim 5, characterized in that the cylindrical gear is straight-toothed.

8. A gearwheel with a toothing system according to claim 1, characterized in that the gearwheel is a bevel gear (18).

9. A gearwheel according to claim 8, characterized in that the bevel gear is straight-toothed.

10. A gearwheel according to claim 8, characterized in that the length of the semiaxes a and b of the ellipse (E) and/or the ellipse tilting angle alpha vary over the pitch-cone distance.

11. A gearwheel according to claim 8, characterized in that the ellipse tilting angle alpha and the semiaxis ratio a/b are constant at least over part of the length of the toothing.

* * * * *